Patented Jan. 25, 1944

2,339,931

UNITED STATES PATENT OFFICE 2,339,931

PROCESS OF PREPARING RENNIN COMPOSITIONS

Havard L. Keil, Clarendon Hills, Ill., assignor to Armour and Company, Chicago, Ill., a corporation of Illinois No Drawing. Application January 19, 1942, Serial No. 427,385

10 Claims. (Cl. 195—68)

This invention relates to rennin compositions and processes of preparing the same.

Rennin is an enzyme widely used in processes for clotting milk in the manufacture of cheese and casein. Many methods have hitherto been used for making rennin preparations and such methods have customarily included the water extraction of rennin-containing animal tissue material for the preparation of rennin therefrom. Such extraction processes inevitably result in loss of available rennin which could otherwise be obtained in active form were more satisfactory processes available for the preparation of rennin compositions.

I have now discovered that rennin compositions of extremely high yield can be prepared without separating the rennin from the animal tissues containing the same. Whereas other methods have always employed actual water extractions of the rennin from the animal tissue, my process is one in which the animal tissue material containing the rennin is processed without dilution in such fashion that the rennin therein is activated and the entire tissue worked up to give a dry rennin product which can be easily dispersed in water to give opalescent solutions substantially free of particles of tissue material which might separate out.

My process includes the steps of liberating and activating the rennin by treatment of the tissue material with appropriate acids, and thereafter incorporating peptizing agents functioning to peptize and disperse the remaining animal tissue material.

The animal tissues used as the starting material are preferably lamb stomachs and calf stomachs since these are commercial sources of rennin. The stomachs are hashed in the usual way and then a suitable acid, such as hydrochloric, is added to give an initial pH value of 1 to 4, preferably about 2. This step differs from the conventional process known to the art for the recovery of rennin from animal stomach in that it is not an extraction from the tissue in an acidified liquid medium, since water of dilution is not added. It is an advantage of my process that the tissue material is not separated from the liberated rennin, since rennin is most stable in the higher concentrations of natural protective tissue substances.

Hitherto the art has physically separated the rennin solution, containing water to the extent of 4 to 6 times the tissue weight, then saturated acid solution with salt to precipitate rennin from the tissue extract and thereafter worked up the rennin-containing precipitate to give a dry product. This physical separation together with the salting out step and subsequent drying has always resulted in the loss of considerable quantities of rennin. In my process I do not perform such a physical separation or salting out step for the separation of the finely divided rennin-containing tissue material from an aqueous rennin solution. However, in some instances where an excessive amount of gristle is associated with the animal stomach I can subject the acidified mixture to a coarse straining step to remove such gristle. The muscle tissue, however, is not separated from the sirupy rennin solution in this straining step.

The acid treatment results in a mixture comprising an acidified aqueous mass containing rennin and the muscle tissue. To this mass I add a peptizing agent which will peptize the animal tissue and put it in an extremely fine state of sub-division. This sub-division is colloidal in character.

I can then immediately dry the entire mixture in a current of air and finally defat the dried mixture with gasoline or other fat solvent. The resulting dried product contains all of the original rennin activity of the stomach and readily disperses in water to give an opalescent solution.

If only a rennin paste is desired, the drying and defatting steps may be omitted.

It is advantageous but not essential to add sodium chloride to the aqueous mass prior to drying. This practice will be found to facilitate drying and act as a diluent. Suitably about 40 parts by weight of sodium chloride may be added per 100 parts by weight of the aqueous mass, to give a rennin product testing in the order of about 1:30,000.

In the step of liberating rennin from the animal tissue any of the acids customarily used for this purpose are suitable. Hydrochloric acid is the most generally used acid, but acetic acid is also operative. As those versed in this art will understand, the acidification step is one in which the pH value of the stomachs is reduced, that is to say, the actual acid concentration is increased, until pro-rennin is converted to rennin. Pro-rennin is the inactive form of the enzyme as it occurs in animal stomachs.

As peptizing agents for dispersing the animal tissue material I prefer to use the phosphates such as the mono, di, and tri potassium phosphates, and the mono, di, and tri sodium phosphates, the tri-sodium phosphate being especially advantageous. Tri-sodium phosphate, for example, may be added to increase the pH to about 5 or 6 when the muscular tissue will go into colloidal solution. Salts, such as sodium citrate, and other salts of a strong base and a relatively weak acid, can be used as peptizing agents, and may be added in quantity sufficient to raise the pH of the mixture to the point where the muscle tissue will disperse colloidally in water.

The following example will illustrate the process steps of my invention in more specific detail.

890 parts by weight of fresh calf stomachs are hashed in the usual way, and then 19.6 parts by volume of 24% strength hydrochloric acid are added. This is enough acid to give a pH value of about 2 to 3 so that the rennin is liberated in an active form in the mixture. Advantageously, the mixture can be heated for about fifteen minutes at a temperature of about 42° C. to 46° C. to hasten the activation of the rennin.

To this mixture is added about 25 parts by weight of tri-sodium phosphate. The pH value is thus increased to about 5.5, a value at which the muscle tissue present becomes colloidally dispersible in water. Then the mixture is evaporated in vacuo or in a current of air while spread out on pans. Obviously the drying temperature should not exceed that at which rennin decomposes.

If the dried mass contains fat, and it is desired to remove the fat, then the dried material is extracted with any suitable fat solvent, such as gasoline or hexane, the solvent decanted off, and the solid residue again dried in a current of air to remove the last traces of the solvent.

The dry residue is finally ground to about 100 mesh when it is desired to sell or store the product as a finely divided powder. The resulting product made in this specific way shows a rennin strength of 1:52600 and a much higher yield than can be obtained by the usual methods. The powder readily disperses in water to give an opalescent solution.

The foregoing specific example is given merely to illustrate the invention and to indicate one specific way in which it may be carried out, and is not intended to be taken in any limiting sense. The process is subject to many modifications, all within the spirit of the invention.

Having thus described my invention, what I claim is:

1. A process for preparing a rennin composition which comprises liberating rennin in animal tissue material containing the same and subjecting the tissue material to the action of a salt of a strong base and a weak acid to peptize the same.

2. A process for preparing a rennin composition which comprises acidifying animal tissue material containing rennin to liberate and activate the rennin therein, and then subjecting the tissue material to the action of a salt of a strong base and a weak acid to peptize the same.

3. A process for preparing a rennin composition which comprises acidifying animal tissue material containing rennin to liberate and activate the rennin, subjecting the animal tissue material to the action of a salt of a strong base and a weak acid to peptize the same and then drying the mixture to obtain a rennin composition containing rennin and peptized tissue material which will colloidally disperse in water.

4. A process for preparing a rennin composition which comprises acidifying animal stomachs to liberate and activate the rennin therein, adding to the resulting mixture a salt of a strong base and a weak acid to peptize the tissue material, and then drying the resulting product.

5. A process for preparing a rennin composition comprising acidifying animal tissue material containing rennin to liberate and activate the rennin and subjecting the tissue material to the action of a phosphoric acid salt to peptize the same.

6. A process for preparing a rennin composition comprising acidifying animal tissue material containing rennin to liberate and activate the rennin and subjecting the tissue material to the action of trisodium phosphate to peptize the same.

7. A process for preparing a rennin composition comprising acidifying animal tissue material containing rennin to liberate and activate the rennin and subjecting the tissue material to the action of sodium citrate to peptize the same.

8. A process for preparing a rennin composition which comprises acidifying animal tissue material containing rennin to a pH of from 1 to 4 to liberate and activate the rennin therein, and subjecting the animal tissue material to the action of a salt of a strong base and a weak acid to peptize the same.

9. A process for preparing a rennin composition which comprises adding hydrochloric acid to animal tissue material containing rennin to produce a pH of from 1 to 4 and liberating and activating the rennin therein, and subjecting the animal tissue material to the action of a salt of a strong base and a weak acid to peptize the same.

10. A process for preparing a rennin composition which comprises acidifying animal tissue material containing rennin to a pH of about 1 to 4 to liberate and activate the rennin therein, and subjecting the tissue material to the action of a salt of a strong base and a weak acid at a pH of from about 5 to 6 to peptize said tissue material.

HAVARD L. KEIL.